US010354528B2

(12) United States Patent
Jiang et al.

(10) Patent No.: US 10,354,528 B2
(45) Date of Patent: Jul. 16, 2019

(54) ADAPTIVE INCIDENT INDICATOR THROUGH VEHICULAR COMMUNICATION SYSTEMS

(71) Applicant: MOTOROLA SOLUTIONS, INC., Chicago, IL (US)

(72) Inventors: Jun Jiang, Sichuan (CN); Yong Tian, Sichuan (CN); Xun Fei, Sichuan (CN); Yahui Gong, Sichuan (CN); Dajun Chen, Sichuan (CN); Wen Feng, Sichuan (CN)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 15/770,748

(22) PCT Filed: Nov. 12, 2015

(86) PCT No.: PCT/CN2015/094480
§ 371 (c)(1),
(2) Date: Apr. 24, 2018

(87) PCT Pub. No.: WO2017/079945
PCT Pub. Date: May 18, 2017

(65) Prior Publication Data
US 2018/0308355 A1    Oct. 25, 2018

(51) Int. Cl.
*G08G 1/0967* (2006.01)
*H04W 4/04* (2009.01)
(Continued)

(52) U.S. Cl.
CPC ... *G08G 1/096791* (2013.01); *G08G 1/09675* (2013.01); *G08G 1/096716* (2013.01);
(Continued)

(58) Field of Classification Search
CPC .......... G08G 1/0967; G08G 1/096733; G08G 1/096766; G08G 1/096775;
(Continued)

(56) References Cited

U.S. PATENT DOCUMENTS 8,736,461 B2    5/2014    Sharma et al.
9,041,554 B2    5/2015    Serex
(Continued)

FOREIGN PATENT DOCUMENTS

CN    101350134    1/2009
CN    103544838    1/2014

OTHER PUBLICATIONS

Wikipedia, "Vehicular communication Systems," website (last edited on Mar. 15, 2018) https://en.wikipedia.org/wiki/Vehicular_communication_systems.
(Continued)

*Primary Examiner* — Brian Wilson

(57) ABSTRACT

A method and apparatus for a first communication device for use with a first vehicle in a system for transmitting information about an incident occurring on a road. The first communication device includes a first receiver to receive an incident indicator. In one embodiment, a first electronic processor is electrically coupled to the first receiver and a first transmitter. The first electronic processor is configured to determine whether to relay a modified incident indicator to other vehicles. The first electronic processor is further configured to modify at least a portion of incident information included in the incident indicator to create the modified incident indicator. The first electronic processor is further configured to control the first transmitter to transmit the modified incident indicator to one or more other vehicles.

16 Claims, 12 Drawing Sheets

(51) Int. Cl.
  *H04W 84/00* (2009.01)
  *H04W 4/90* (2018.01)
  *H04W 4/46* (2018.01)

(52) U.S. Cl.
  CPC ...... *G08G 1/096783* (2013.01); *H04W 4/046* (2013.01); *H04W 4/46* (2018.02); *H04W 4/90* (2018.02); *H04W 84/00* (2013.01)

(58) Field of Classification Search
  CPC ....... G08G 1/096783; G08G 1/096791; G08G 1/09675; G08G 1/096716; H04W 4/46; H04W 4/046; H04W 4/90; H04W 84/00
  See application file for complete search history.

(56) References Cited

U.S. PATENT DOCUMENTS

2002/0030611 A1* 3/2002 Nuesser ............. G08G 1/092
  340/992
2013/0154853 A1* 6/2013 Chen ............. G08G 1/096716
  340/905
2015/0199902 A1* 7/2015 Hayee ............. G08G 1/0955
  340/907

OTHER PUBLICATIONS

Milojevic et al., "Short Paper: Distributed Vehicular Traffic Congestion Deetecton Algorithm for Urban Environments," specification, IEEE Vehicular Networking Conference, VNC (2013) pp. 182-185, ISSN 2157-9857.

Garcia-Costa et al., "A Stochastic Model for Chain Collisions of Vehicles Equipped with Vehicular Communications," specification, IEEE Transactions on Intelligent Transportation Systems, vol. 13, No. 2 (Jun. 2012) pp. 503-518.

Rehman et al., "Efficient Alert Messages Dissemination in VANETs using Single-Hop Distributed Protocols," work-in-progress paper (2013) 4 pages.

Chen et al., "Broadcasting Safety Information in Vehicular Networks: Issues and Approaches," specification, IEEE Network (2010) pp. 20-25.

PCT/CN2015/094480 International Search Report and Written Opinion of the International Searching Authority dated Aug. 3, 2016 (11 pages).

* cited by examiner

ADAPTIVE INCIDENT INDICATOR THROUGH VEHICULAR COMMUNICATION SYSTEMS

BACKGROUND OF THE INVENTION

Vehicle breakdowns, accidents, criminal investigations, and other incidents may occur on or near highways or other roads. As a consequence, traffic is often slowed or stopped on parts or all of the affected road. When such incidents occur, certain personnel (i.e., highway patrol officer, police officer, and the like) often set up a sign or blockade on the road to warn approaching vehicles of the incident. However, such signs and blockades are detected passively by the human eye and have a number of drawbacks. One drawback of passively-detected signs and blockades is that the visible range is limited (i.e., the sign or blockade may only be viewed by vehicles that are in close proximity to the sign or blockade). Furthermore, adverse weather conditions may make it difficult to observe signs and blockades. Additionally, the signs and blockades may only provide a limited amount of information about the incident to drivers of vehicles approaching the incident.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
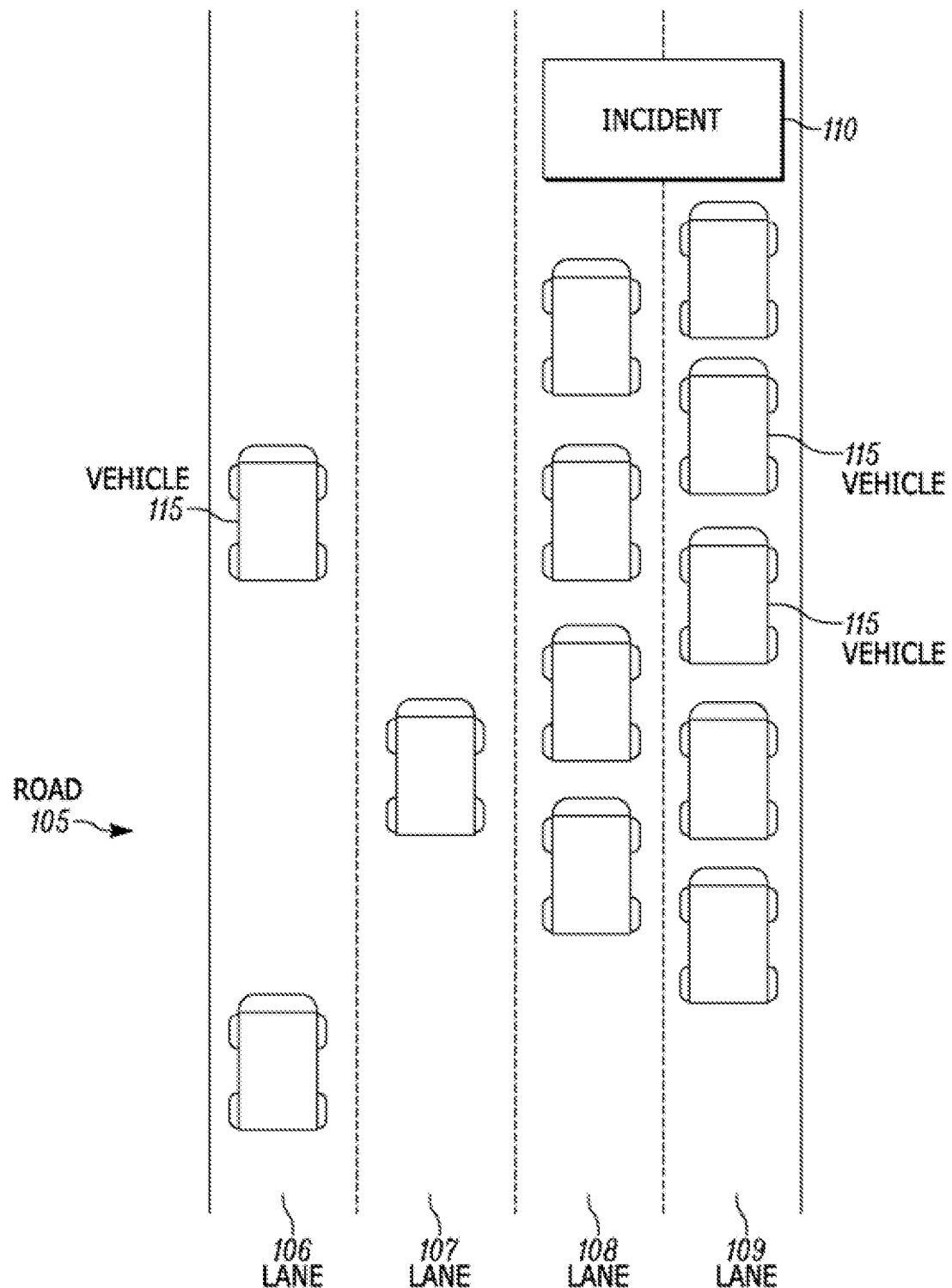
FIG. 1 illustrates vehicles on a multiple-lane road on which an incident has occurred.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

One embodiment provides a first communication device for use with a first vehicle in a system for transmitting information about an incident occurring on a road. In one example, the first communication device includes a first receiver to receive an incident indicator from one of a group consisting of a road side station and another vehicle. The first communication device further includes a first electronic processor electrically coupled to the first receiver and a first transmitter. The first electronic processor is configured to determine, as a function of incident information included in the incident indicator and one or more sensed parameters of the first vehicle, whether to relay a modified incident indicator to one or more other vehicles. The first electronic processor is further configured to modify at least a portion of the incident information included in the incident indicator to create the modified incident indicator based on the one or more sensed parameters of the first vehicle. The first electronic processor is further configured to control the first transmitter to transmit the modified incident indicator to one or more other vehicles.

Another embodiment provides a method of transmitting information about an incident occurring on a road. In one example, the method includes receiving, by a first receiver of a first communication device for use with a first vehicle, an incident indicator from one of a group consisting of a road side station and another vehicle. The method further includes determining, with a first electronic processor, as a function of incident information included in the incident indicator and one or more sensed parameters of the first vehicle, whether to relay a modified incident indicator to one or more other vehicles. The method further includes modifying, with the first electronic processor, at least a portion of the incident information included in the incident indicator to create the modified incident indicator based on the one or more sensed parameters of the first vehicle. The method further includes transmitting, with a first transmitter, the modified incident indicator to one or more other vehicles.

FIG. 1 illustrates a road 105 that includes four lanes 106, 107, 108, and 109 of traffic. The road 105 is merely exemplary and may be any path in which a vehicle may travel. A vehicle may include any instrument that may be used for transportation (i.e., an automobile, a bicycle, a motor scooter, and the like). An incident 110 is shown on the lanes 108 and 109 of the road 105. The incident 110 may be an accident between two or more vehicles, a broken down vehicle, an object impeding traffic, a natural disaster (i.e., flooding), and the like. As shown in FIG. 1, the incident 110 may cause traffic to slow down or stop as vehicles 115 try to proceed around the incident 110.

Figure 2:
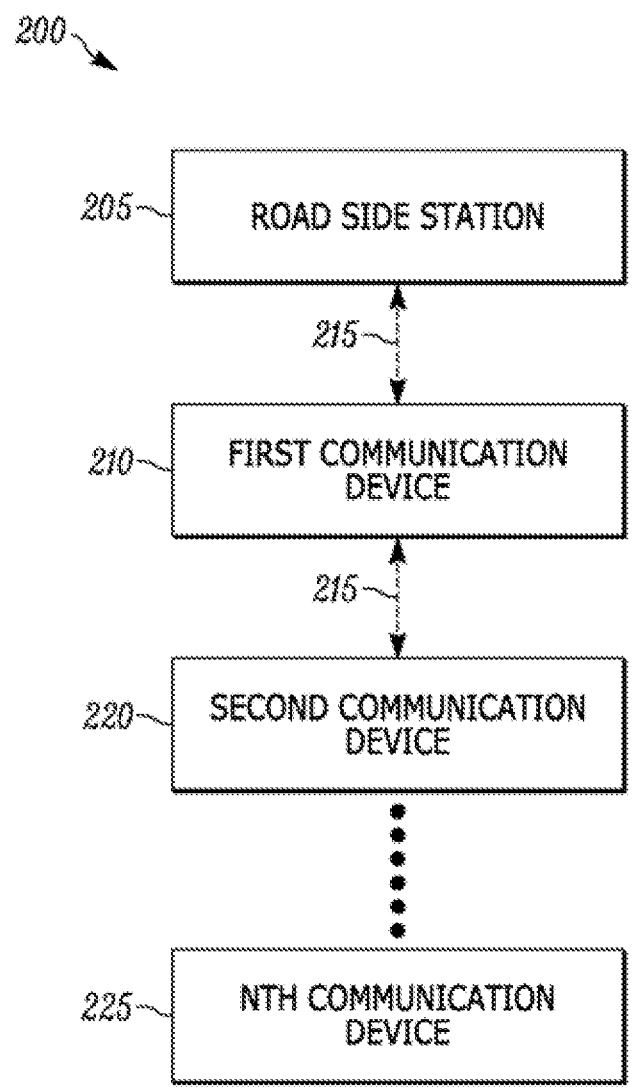
FIG. 2 illustrates a block diagram of a system for communicating information about the incident to vehicles on the road.

FIG. 2 illustrates a block diagram of a system 200 that may be used to communicate information about the incident 110 to the vehicles 115. The vehicles 115 may then relay the information to other vehicles 115 that are farther away from the incident 110, as will be explained in greater detail below.

Such communication may allow the vehicles 115 to maneuver more effectively past the incident 110. FIG. 2 illustrates a road side station 205 that broadcasts an incident indicator that includes incident information about the incident. For example, the information may include, but is not limited to, a description of the incident, a recommended driving maneuver (i.e., recommending a lane switch), a location of the incident (i.e., a longitude and latitude of the incident) or incident location, an identification of the lane(s) 108 and 109 (lane identification) in which the incident occurred, a maximum allowable speed to be traveled through the incident, and a status of the lane(s) 106, 107, 108, and 109 on the road 105.

The information may also include the number of vehicles that are blocked on the lane(s) 108 and 109 where the incident is located (i.e., the number of vehicles traveling at or below a predetermined speed). The plurality of vehicles may be referred to as being "queued" or being located within a "vehicle queue;" and the predetermined speed may be referred to as a "queue entry speed." For example, referring to FIG. 1, the vehicles 115 shown in the lanes 108 and 109 are considered queued when they are traveling at or below the queue entry speed. On the other hand, the vehicles 115 shown in the lanes 106 and 107 are not considered to be in the vehicle queue when they are traveling at a speed greater than the queue entry speed.

In addition to the number of vehicles in the vehicle queue, the information included in the incident indicator may include the vehicle queue length (i.e., the distance from the incident 110 to the last vehicle in the vehicle queue). Furthermore, the information included in the incident indicator may also include an identification of a device transmitting the incident indicator, a location of the device transmitting the incident indicator, and a maximum allowable speed for vehicles to travel through the incident. The incident indicator may include any combination of the information described in this paragraph and in previous paragraphs. The incident indicator may also include additional information relating to the incident 110, the vehicle queue, and/or the device transmitting the incident indicator.

The road side station 205 may acquire data relating to the speed and location of vehicles within communication range of the road side station 205. The road side station 205 may use the data received from vehicles within communication range to determine some of the information described above that is included in the incident indicator.

In FIG. 2, the road side station 205 communicates with a first communication device 210 over one of a plurality of wireless communication links 215. The first communication device 210 communicates with a second communication device 220 over another wireless communication link 215. In turn, continued communication may occur such that an (N−1)th communication device (not shown) communicates with an Nth communication device 225 over yet another wireless communication link 215 (not shown). The first communication device 210, the second communication device 220, and the Nth communication device 225 may each be located in or on separate vehicles (i.e., a first vehicle, a second vehicle, and an Nth vehicle, respectively).

The communication devices 210, 220, and 225 may be, for example, a personal computer (e.g., a laptop computer or tablet computer), a mobile telephone, a pager, a two-way radio, a mobile device mounted within the dashboard of a vehicle, or a combination thereof. In some embodiments, one or more of the communication devices 210, 220, and 225 is a converged device capable of communicating over multiple communication networks. Furthermore, wireless communication links 215 may be established using a cellular network, a land-mobile radio (LMR) network, a long-term evolution (LTE) network, and/or a third generation (3G) network. In some embodiments, other networks, including future developed networks, Wi-Fi networks (that is, IEEE 802.11x), and Bluetooth networks may be employed to establish the communication links 215. The above examples of communication devices 210, 220, and 225 and wireless communication links 215 are merely exemplary and are not to be construed as limiting.

In one exemplary embodiment, the first communication device 210 receives the incident indicator from the road side station 205. Depending on the location, speed, and/or other sensed parameters of the first vehicle, the first communication device 210 may relay the incident indicator to the second communication device 220, as will be explained in greater detail below. Furthermore, depending on the location, speed, and/or other sensed parameters of the first vehicle, the first communication device 210 may modify the information received in the incident indicator to create a modified incident indicator. The first communication device 210 may relay the modified incident indicator to the second communication device 220. The modified incident indicator will be explained in more detail below. When the incident indicator or modified incident indicator is received by the second communication device 220 or Nth communication device 225, the receiving communication device may operate similarly to the first communication device 210 as described above.

Figure 3:
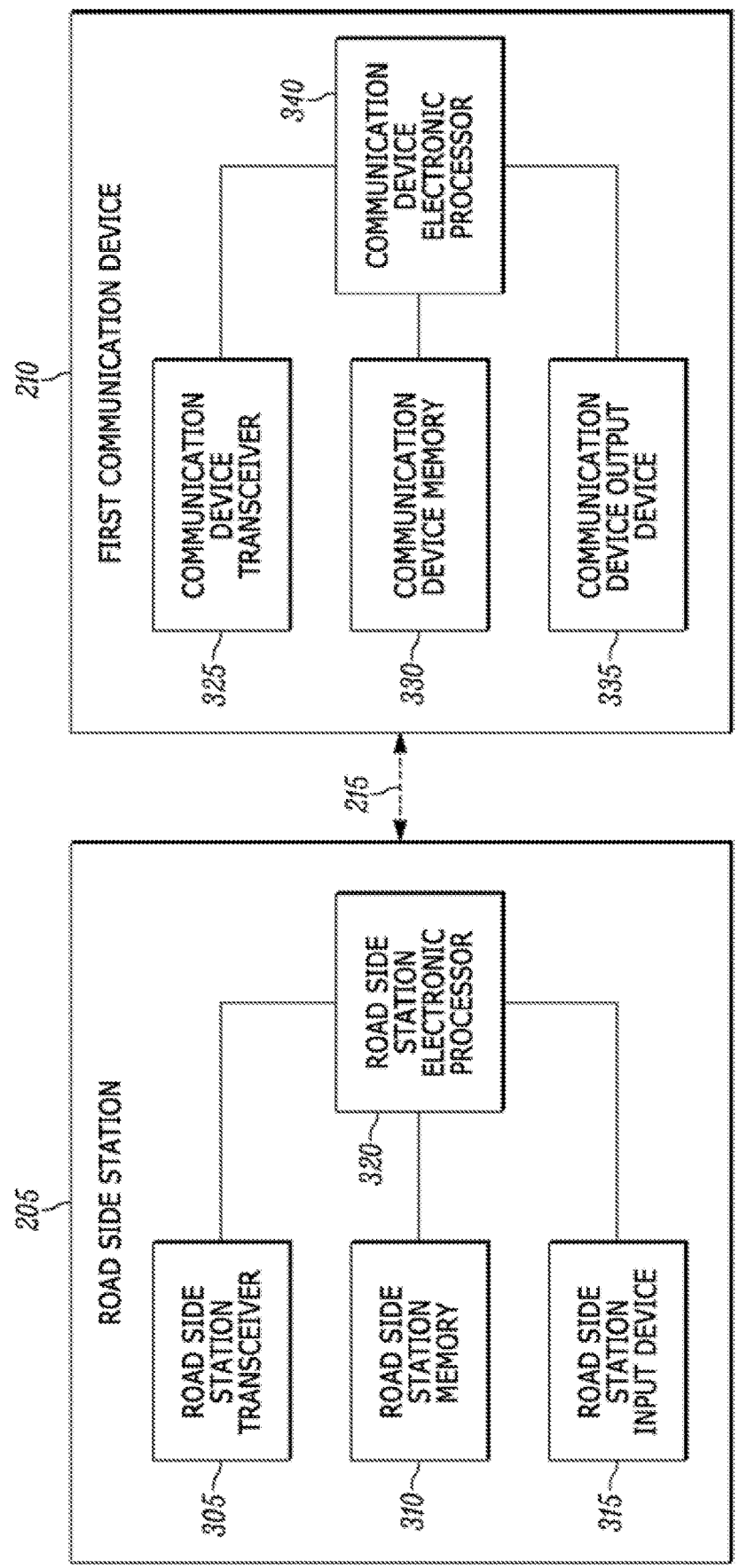
FIG. 3 illustrates a block diagram of a road side station and a first communication device of a vehicle in accordance with some embodiments.

FIG. 3 illustrates a block diagram of an exemplary road side station 205 and an exemplary first communication device 210. It will be appreciated that other arrangements of either or both of the road side station 205 and the first communication device 210 are within the scope of the invention. The road side station 205 includes a road side station transceiver 305, a road side station memory 310, a road side station input device 315, and a road side station electronic processor 320. In some embodiments, the road side station 205 may also include a road side station output device (not shown) that may generate outputs such as a visual display, an audible noise, and/or a voice warning. The road side station memory 310 may be a computer-readable, non-transitory memory device and may include one or more memory components such as, for example, a hard disk, Random-Access Memory (RAM), Read Only Memory (ROM), Flash, or other types of memory media. The road side station electronic processor 320 communicates with the road side station memory 310 to access computer-executable instructions stored on the road side station memory 310 and to read and write data from and to the road side station memory 310. The instructions stored on the road side station memory 310 are executed by the road side station electronic processor 320 to provide, among other things, the functionality described below.

The road side station electronic processor 320 receives an input from the road side station input device 315. For example, information relating to the incident, as described in previous paragraphs, may be input to the road side station input device 315 and stored in the road side station memory 310. The road side station input device 315 may be a keyboard, a touch screen, or any other device that allows data to be received by the road side station electronic processor 320 from an external source. In some embodiments, the road side station input device 315 may receive information relating to the incident from an external device (not shown). The road side station input device 315 may also receive inputs that specify what information should be included in the incident indicator.

The road side station electronic processor 320 controls the road side station transceiver 305 to transmit data (i.e., the incident indicator) to communication devices and other devices. For example, the road side station transceiver 305 may transmit the incident indicator to a first communication device 210 of a first vehicle that is on the road 105 and is within communication range of the road side station 205. The road side station transceiver 305 may also receive communications from the communication devices or other devices (i.e., an acknowledgement signal). The road side station transceiver 305 also receives data from and sends data to the road side station electronic processor 320.

Although FIG. 3 shows one road side station transceiver 305, some embodiments of the road side station 205 include more than one road side station transceiver 305. Alternatively, in addition to or in place of the road side station transceiver 305, some embodiments of the road side station 205 include a separate transmitter and a separate receiver. The road side station transceiver 305 may be implemented using various types of transceivers including, but not limited to, radio frequency modems, frequency modulation two-way radios, long-term evolution (LTE) transceivers, code division multiple access (CDMA) transceivers, Wi-Fi (i.e., IEEE 802.11x) modules, and the like.

As mentioned in previous paragraphs, the first communication device 210 is proximately located in or on a first vehicle on the road 105. The first communication device 210 includes a communication device transceiver 325, a communication device memory 330, a communication device output device 335, and a communication device electronic processor 340. In some embodiments, the first communication device 210 may also include a communication input device (not shown) that is similar to the road side station input device 315. The communication device transceiver 325 is similar to the road side station transceiver 305 and may be implemented in the same various manners as discussed in previous paragraphs with respect to the road side station transceiver 305. The communication device transceiver 325 receives the incident indicator from the road side station transceiver 305. The communication device electronic processor 340 determines how to use the information received in the incident indicator, as will be described in more detail below. The communication device electronic processor 340 is similar to the road side station electronic processor 320. The communication device electronic processor 340 may store data in the communication device memory 330, which is similar to the road side station memory 310. The communication device memory 330 may be implemented in the same various manners as discussed in previous paragraphs with respect to the road side station memory 310.

In the example presented, the communication device electronic processor 340 controls the communication device output device 335 to present an output in a human-perceptible format based on the information received in the incident indicator. For example, the communication device output device 335 may include a visual display that presents information received in the incident indicator (i.e., that a certain lane(s) 106, 107, 108, and/or 109 is(are) blocked). In some embodiments, the communication device output device 335 may produce an audible noise, a voice warning, a textual display, and/or a haptic notification that relates to information in the incident indicator. The communication device output device 335 may present an output in any human-perceptible format to convey information received in the incident indicator.

Although not shown, the second communication device 220 and the Nth communication device 225 include similar components as the first communication device 210 described in previous paragraphs.

Based on the speed and location of the first vehicle, the first communication device 210 may modify and/or relay the incident indicator on to other communication devices (i.e., the second communication device 220) of other vehicles (i.e., a second vehicle) that are farther away from the road side station 205. Similarly, the second communication device 220 then may modify and/or relay the incident indicator received from the first communication device 210 onto additional vehicles. This process is repeated by many communication devices to relay information about the incident 110 to vehicles on the road 105 that are not within communication range of the road side station 205.

Figure 4:
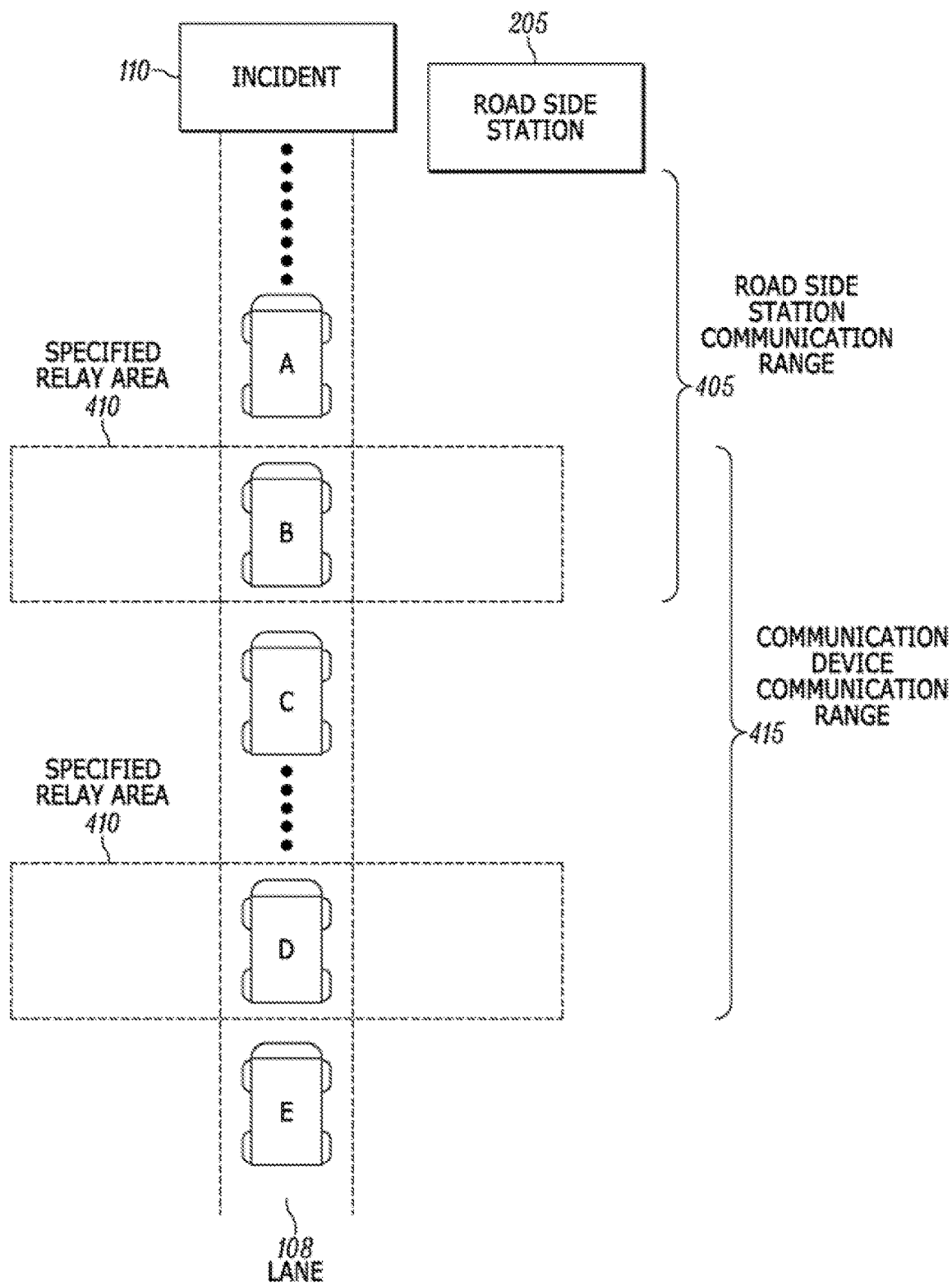
FIG. 4 illustrates one lane of the road where the incident has occurred.

FIG. 4 illustrates an example where the incident 110 has occurred in the lane 108 of the road 105. FIG. 4 shows a number of vehicles (labelled A, B, C, D, and E). The ellipsis between the incident 110 and vehicles A indicate that the incident 110 and the vehicle A are not as close together as they appear in FIG. 4. Similarly, the ellipsis between vehicles C and D indicate that these vehicles are not as close together as they appear in FIG. 4. Additional vehicles (not shown) may be present between the incident 110 and the vehicle A and/or between vehicles C and D. The road side station 205 is located near the location of the incident 110. The road side station 205 broadcasts the incident indicator to communication devices of vehicles on the road 105. FIG. 4 shows a road side station communication range 405 that illustrates a maximum distance in which the incident indicator may be communicated from the road side station 205. The maximum distance may be configurable (i.e., the road side station communication range 405 may be adjusted to be a distance less than the maximum distance that the road side station transceiver 305 is physically capable of communicating). The road side station communication range 405 defines one boundary of a specified relay area 410. The other boundary of the specified relay area 410 is configurable and may be adjusted depending on the situation in which the system 200 is used. When a vehicle within the specified relay area 410 receives the incident indicator from the road side station 205, the vehicle relays the incident indicator as will be explained in greater detail below. For example, in FIG. 4, vehicle A receives the incident indicator from the road side station 205 because vehicle A is within the road side station communication range 405. However, vehicle A may not relay the incident indicator because it is not within the specified relay area 410. Like vehicle A, vehicle B will also receive the incident indicator from the road side station 205. Additionally, vehicle B will relay the incident indicator to other vehicles because vehicle B is within the specified relay area 410.

Similarly, a communication device communication range 415 defines one boundary of a second specified relay area 410. Again, the other boundary of the second specified relay area 410 is configurable and may be adjusted depending the situation in which the system 200 is used. When a vehicle within the second specified relay area 410 receives the incident indicator from vehicle B, the vehicle relays the incident indicator as will be explained in greater detail below. Similar to the above example, vehicle C may not relay the incident indicator received from vehicle B while vehicle D will relay the incident indicator received from vehicle B.

Although FIG. 4 only shows two specified relay areas 410, additional specified relay areas may continue down the road 105 at similar distances apart from each other or at varying distances apart from each other. Additionally, the specified relay areas 410 shown in FIG. 4 are merely exemplary and are not drawn to scale. For example, the specified relay area 410 may be large enough to include multiple vehicles. Similarly, the labeled distances (i.e., the road side station communication range 405, the communication device communication range 415, and the like) illustrated in FIGS. 1 and 4 through 9 are not drawn to scale.

The functionality of each communication device in the system 200 (i.e., the first communication device 210, the second communication device 220, and the Nth communication device 225) is similar and will be described below with respect to a communication device on a receiving vehicle that has received the incident indicator from a transmitting vehicle. One skilled in the art will realize that the same concepts may apply to other vehicles that receive the incident indicator either from the road side station 205 or from a vehicle that relayed the incident indicator.

FIG. 5 through FIG. 9 illustrate different scenarios of traffic on the road 105. Depending on the location and speed of the receiving vehicle (i.e., the vehicle receiving the incident indicator), the communication device of the receiving vehicle may modify and/or relay the incident indicator to other vehicles.

Figure 5:
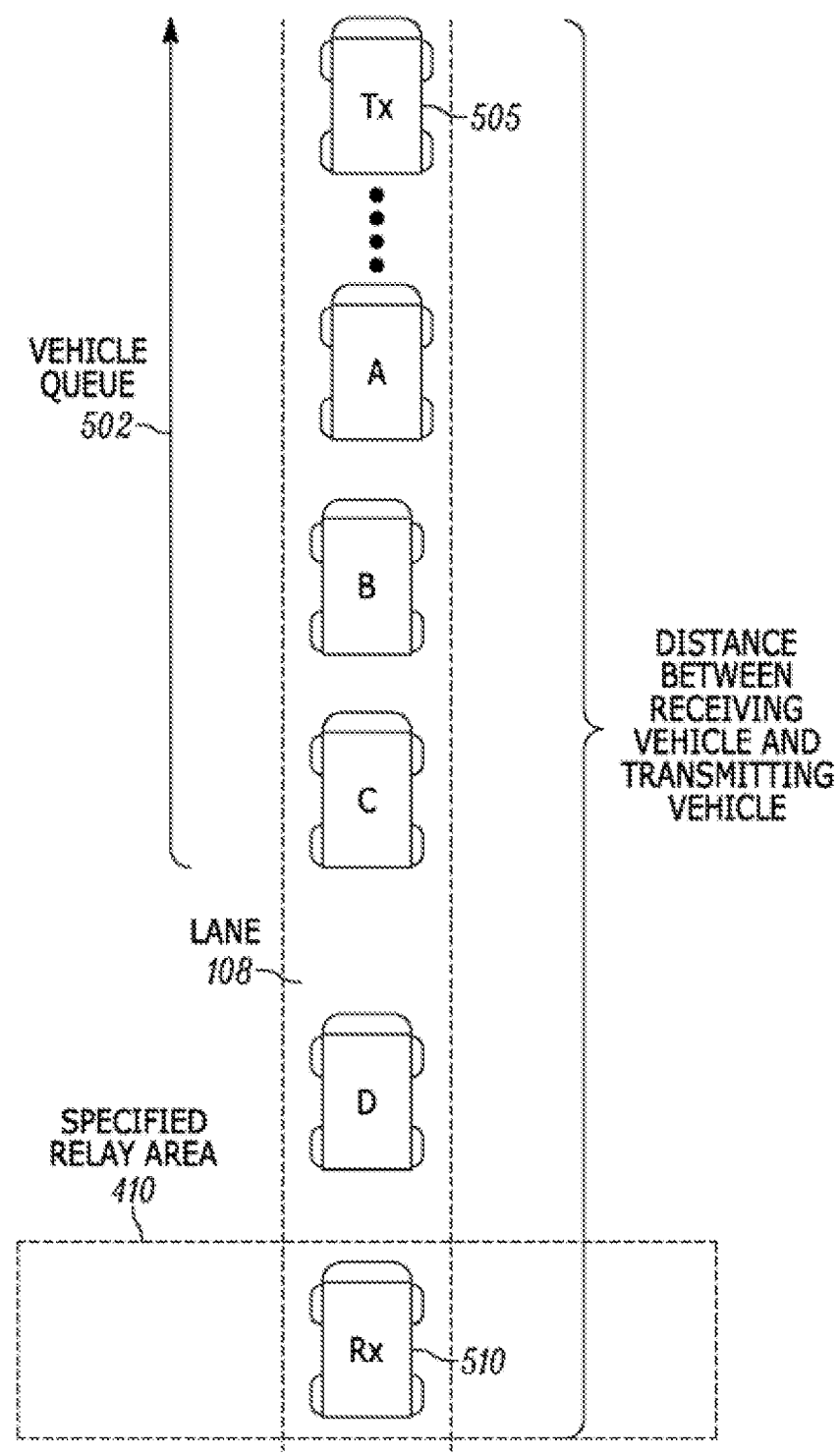
FIG. 5 illustrates the one lane of the road where the incident has occurred with the vehicles arranged to represent a first scenario.

FIG. 5 illustrates a traffic situation where a vehicle queue 502 is outside the specified relay area 410. The vehicle queue 502 includes vehicle A, vehicle B, vehicle C, and a transmitting vehicle 505. The vehicle queue 502 also includes additional vehicles (not shown) that are located between vehicle A and the transmitting vehicle 505, which are separated by a greater distance than is shown in FIG. 5, as indicated by the ellipsis between them. The vehicle queue 502 also includes additional vehicles (not shown) located ahead of the transmitting vehicle 505 on the lane 108, as indicated by the arrow labeling the vehicle queue 502 in FIG. 5. The above vehicles are considered to be queued because they are traveling at a speed less than or equal to a queue entry speed. For example, vehicles are considered queued when they are traveling at or below the queue entry speed. On the other hand, vehicles are not considered to be in the vehicle queue 502 when they are traveling at a speed greater than the queue entry speed. Accordingly, vehicle D and a receiving vehicle 510 are not queued because they are traveling at a speed faster than the queue entry speed.

FIG. 5 does not show the road side station 205. However, in the scenario shown, the transmitting vehicle 505 has received the incident indicator from the road side station 205 and relayed the incident indicator to the receiving vehicle 510. While vehicles A, B, C, and D also receive the incident indicator relayed from the transmitting vehicle 505, for ease of description, only the functionality of the receiving vehicle 510 is described. Furthermore, in this description, when vehicles are described as receiving and transmitting data, it is to be understood that the communication devices of the vehicles (and, in particular, the transceivers of the communication devices) are the components that are receiving and transmitting data.

When the receiving vehicle 510 receives the incident indicator from the transmitting vehicle 505, the receiving vehicle 510 determines the distance between the receiving vehicle 510 and the transmitting vehicle 505, as will be explained in greater detail below. The distance between the receiving vehicle 510 and the transmitting vehicle 505 allows the receiving vehicle 510 to determine whether the receiving vehicle 510 is with the specified relay area 410. Additionally, when the receiving vehicle 510 receives the incident indicator, the receiving vehicle 510 also determines the speed that the receiving vehicle 510 is traveling. By determining its own speed, the receiving vehicle 510 may determine whether the receiving vehicle 510 is queued or not queued (i.e., whether the receiving vehicle 510 is traveling at or below the queue entry speed). Based on whether the receiving vehicle 510 is within the specified relay area 410 and whether the receiving vehicle 510 is queued, the receiving vehicle 510 determines whether to modify and/or relay the incident indicator to other vehicles.

In FIG. 5, the receiving vehicle 510 is located within the specified relay area 410. Thus, the receiving vehicle 510 relays the incident indicator. However, in FIG. 5, the receiving vehicle 510 is not queued. Thus, the receiving vehicle 510 will not modify vehicle queue information included in the incident indicator before relaying the incident indicator (because the vehicle queue information is current). However, in some embodiments, the receiving vehicle 510 may modify other information included in the incident indicator to create a modified incident indicator. For example, the receiving vehicle 510 may update the location from which the incident indicator is being sent (i.e., update the sending location to the location of the receiving vehicle 510). Additionally, the receiving vehicle 510 may update a sender identification of the incident indicator or may modify the status of a lane 106, 107, 108, and/or 109 on the road 105.

Figure 6:
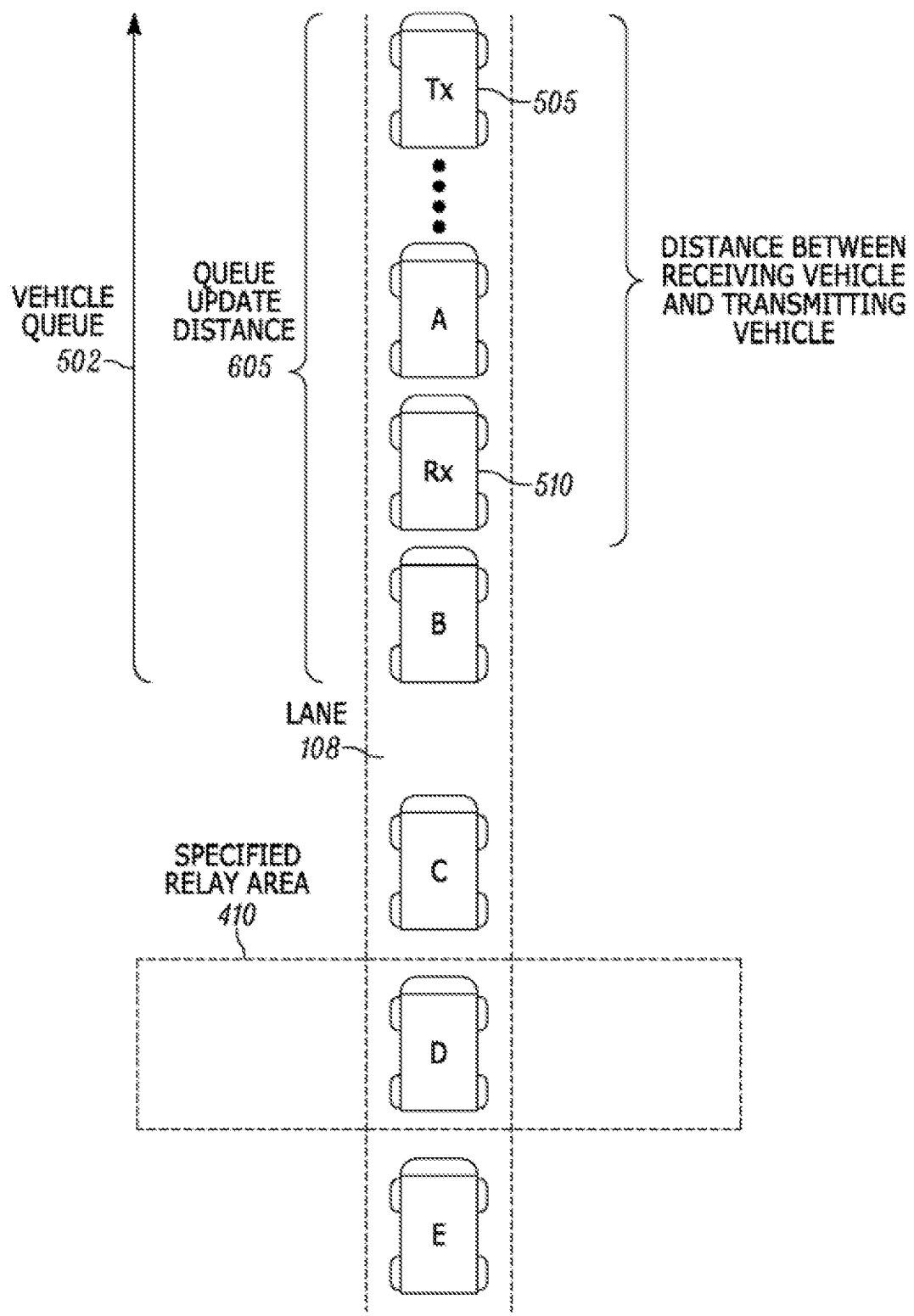
FIG. 6 illustrates the one lane of the road where the incident has occurred with the vehicles arranged to represent a second scenario.

In FIG. 6, the receiving vehicle 510 is located outside the specified relay area 410. Thus, the receiving vehicle 510 may not relay the incident indicator. However, in some scenarios, the receiving vehicle 510 may modify and relay the incident indicator even when the receiving vehicle 510 is not in the specified relay area 410. Such a scenario occurs when the receiving vehicle 510 is queued and the difference between an actual vehicle queue length is longer than the vehicle queue length received in the incident indicator by a predetermined distance (referred to as a queue update distance 605). Stated another way, the queue update distance 605 controls the accuracy of the vehicle queue information in between specified relay areas 410.

For example, in FIG. 6, the transmitting vehicle 505 sends vehicle queue information based on the information included in the incident indicator from the road side station 205 and based on its own sensed parameters. Without the queue update distance 605, this vehicle queue information may not be updated by vehicle A, vehicle B, vehicle C, or the receiving vehicle 510 because all of those vehicles are outside the specified relay area 410. Thus, vehicle C may receive the same incident indicator as vehicle A even though vehicle B and the receiving vehicle 510 are also queued ahead of vehicle C. Accordingly, the queue update distance 605 is used to determine when queued vehicles that are not within the specified relay area 410 should nonetheless modify and relay the incident indicator. This feature improves the accuracy of the vehicle queue information included in the incident indicator.

In FIG. 6, the receiving vehicle 510 is queued. Thus, the receiving vehicle 510 determines whether the distance between the receiving vehicle 510 and the transmitting vehicle 505 is greater than the queue update distance 605. In FIG. 6, the distance between the receiving vehicle 510 and the transmitting vehicle 505 is less than the queue update distance 605. Therefore, the receiving vehicle 510 does not modify or relay the incident indicator received from the transmitting vehicle 505.

Figure 7:
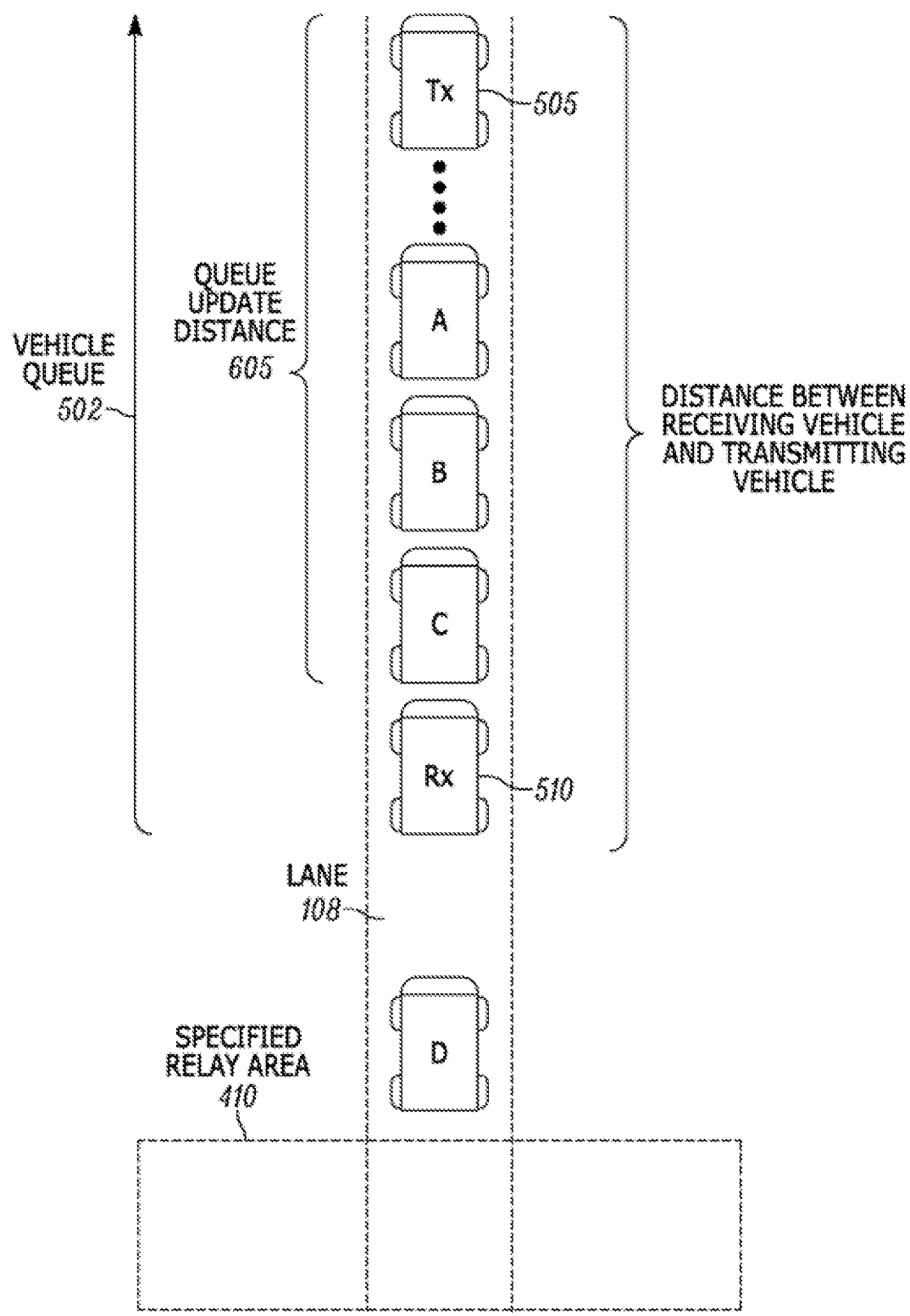
FIG. 7 illustrates the one lane of the road where the incident has occurred with the vehicles arranged to represent a third scenario.

In FIG. 7, the receiving vehicle 510 is again located outside the specified relay area 410. However, the receiving vehicle 510 is also again queued. Thus, the receiving vehicle 510 determines whether the distance between the receiving vehicle 510 and the transmitting vehicle 505 is greater than the queue update distance 605. As shown in FIG. 7, the distance between the receiving vehicle 510 and the transmitting vehicle 505 is greater than the queue update distance 605. Therefore, to ensure the accuracy of vehicle queue information included in the incident indicator, the receiving vehicle 510 modifies the vehicle queue information of the incident indicator. The modification creates a modified incident indicator that may update a vehicle queue length (i.e., the distance from the incident 110 and the last vehicle that is known to be queued by the receiving vehicle 510). An amount of vehicles in the vehicle queue 502 may also be modified by the receiving vehicle 510. Additionally, other information relating to the vehicle queue 502 may be modified to create the modified incident indicator. The modified incident indicator may then be relayed to other vehicles.

Figure 8:
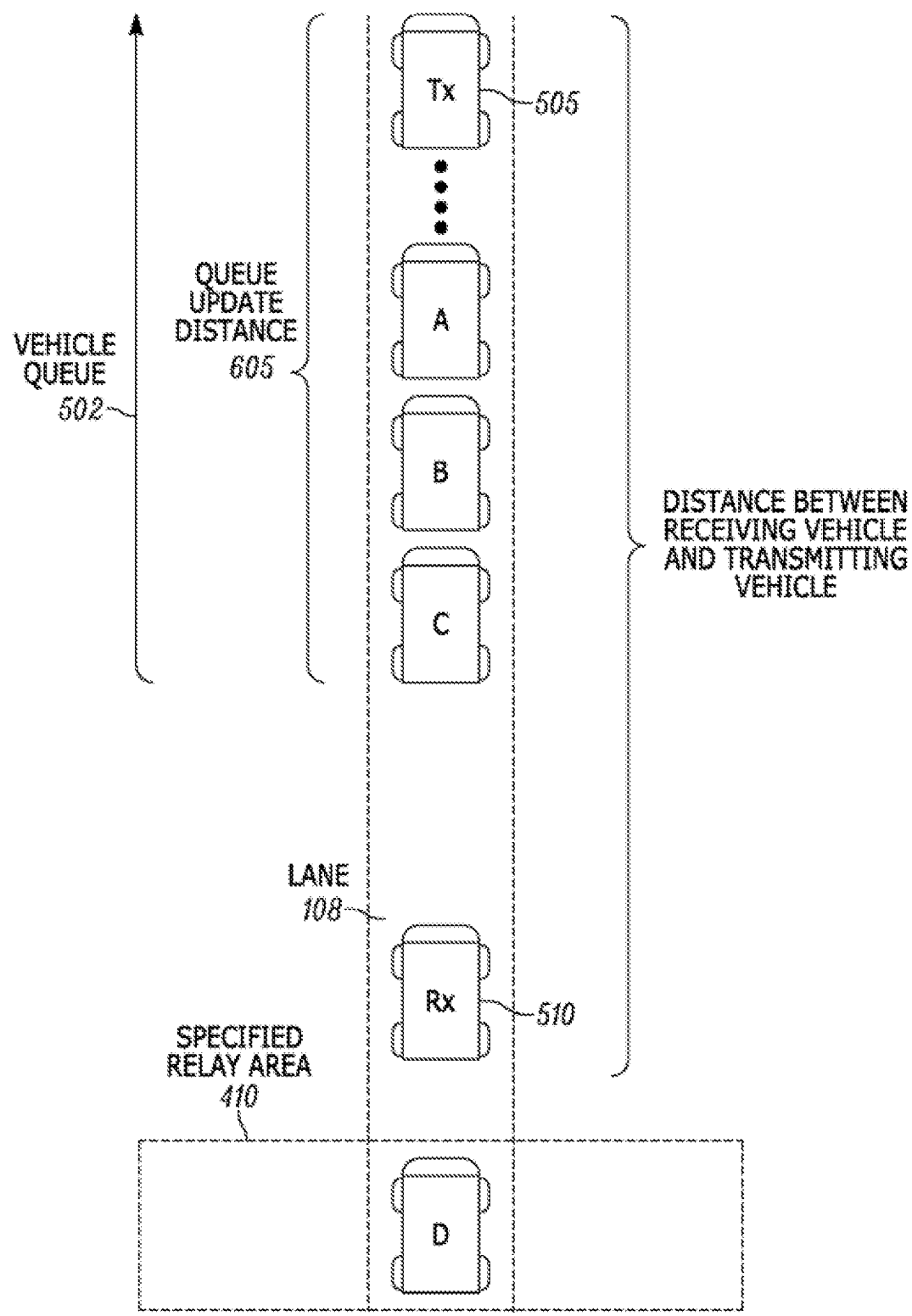
FIG. 8 illustrates the one lane of the road where the incident has occurred with the vehicles arranged to represent a fourth scenario.

In FIG. 8, the receiving vehicle 510 is again located outside the specified relay area 410. Additionally, the receiving vehicle 510 is not queued (i.e., traveling at a speed greater than the queue entry speed). Therefore, the receiving vehicle 510 does not modify or relay the incident indicator even though the distance between the receiving vehicle 510 and the transmitting vehicle 505 is greater than the queue update distance 605. The receiving vehicle 510 does not utilize the queue update distance 605 when the receiving vehicle 510 is not queued.

Figure 9:
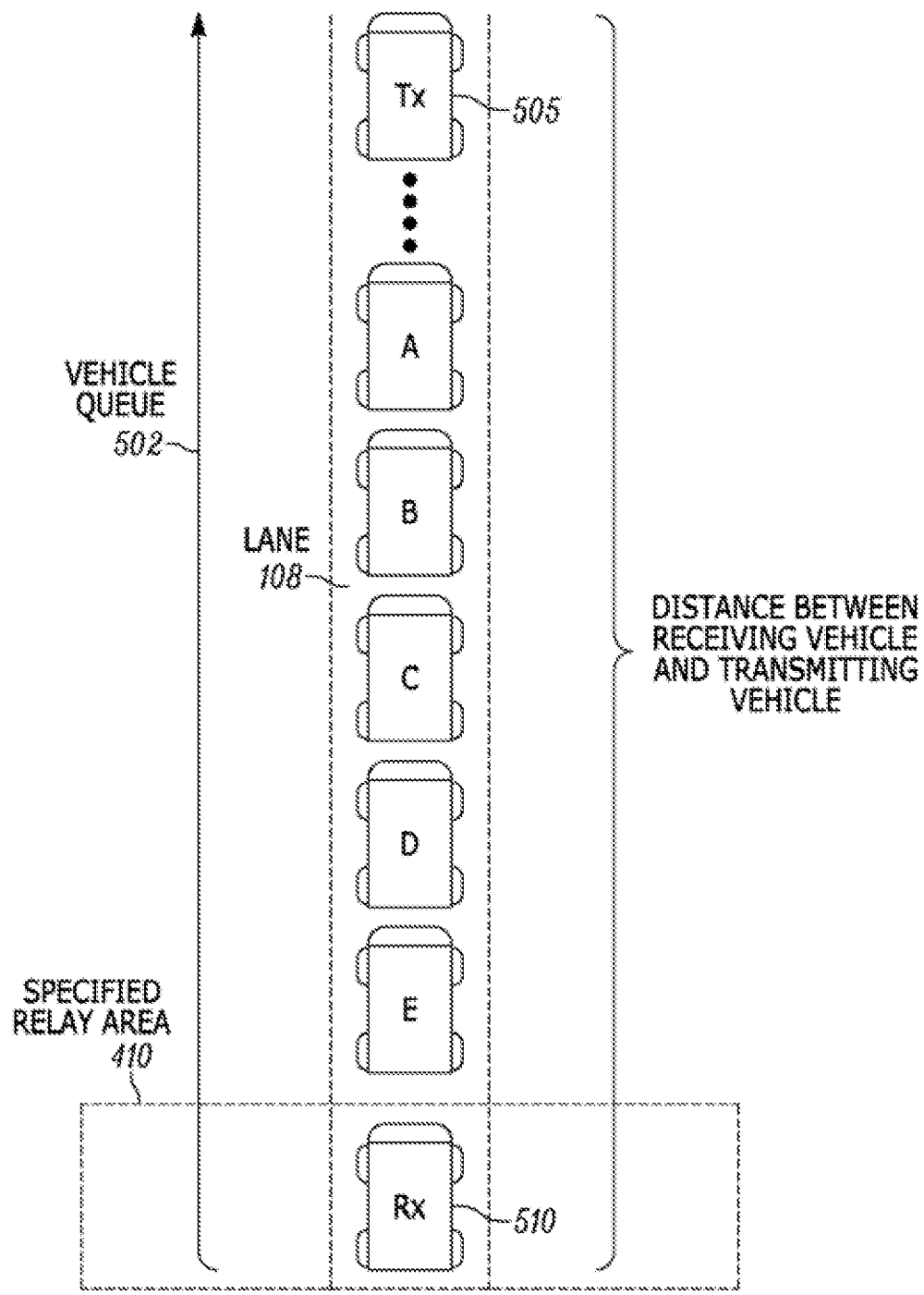
FIG. 9 illustrates the one lane of the road where the incident has occurred with the vehicles arranged to represent a fifth scenario.

Similar to FIG. 5, in FIG. 9, the receiving vehicle 510 is located within the specified relay area 410. Thus, the receiving vehicle 510 relays the incident indicator. However, unlike FIG. 5, the receiving vehicle 510 is queued in FIG. 9. Thus, before relaying the incident indicator, the receiving vehicle 510 modifies vehicle queue information to create the modified incident indicator as described in previous paragraphs. The receiving vehicle 510 then relays the modified incident indicator to other vehicles.

Figure 10A:
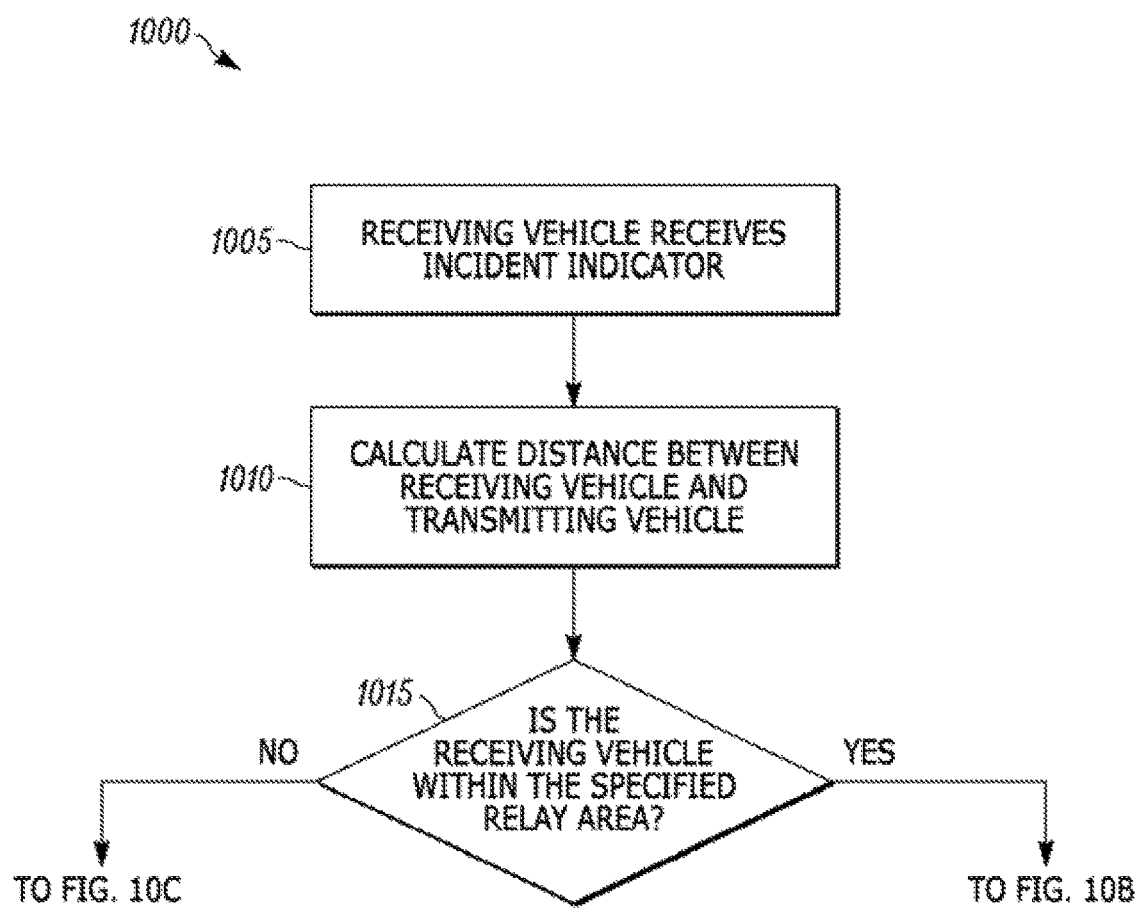
FIGS. 10A through 10C illustrate a flowchart of a method for a vehicle relaying an incident indicator to other vehicles in the road.
Figure 10B:
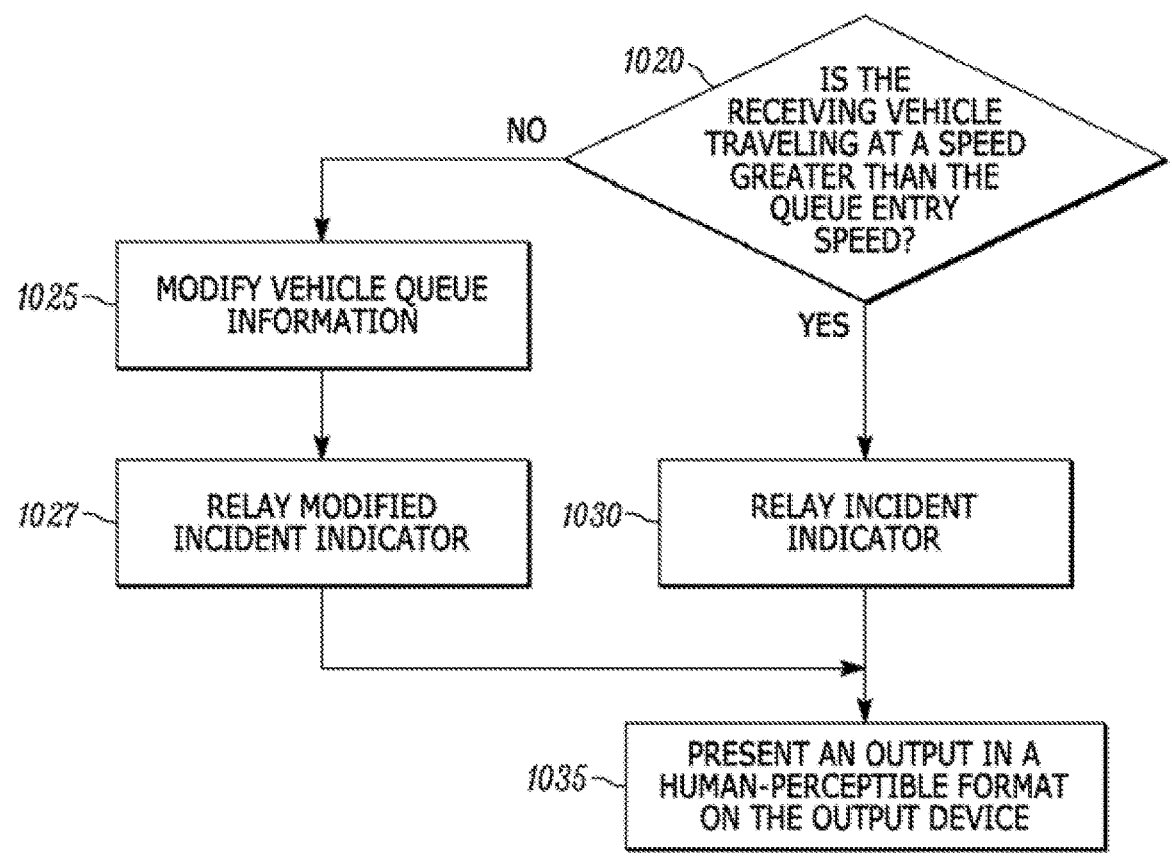
Figure 10C:
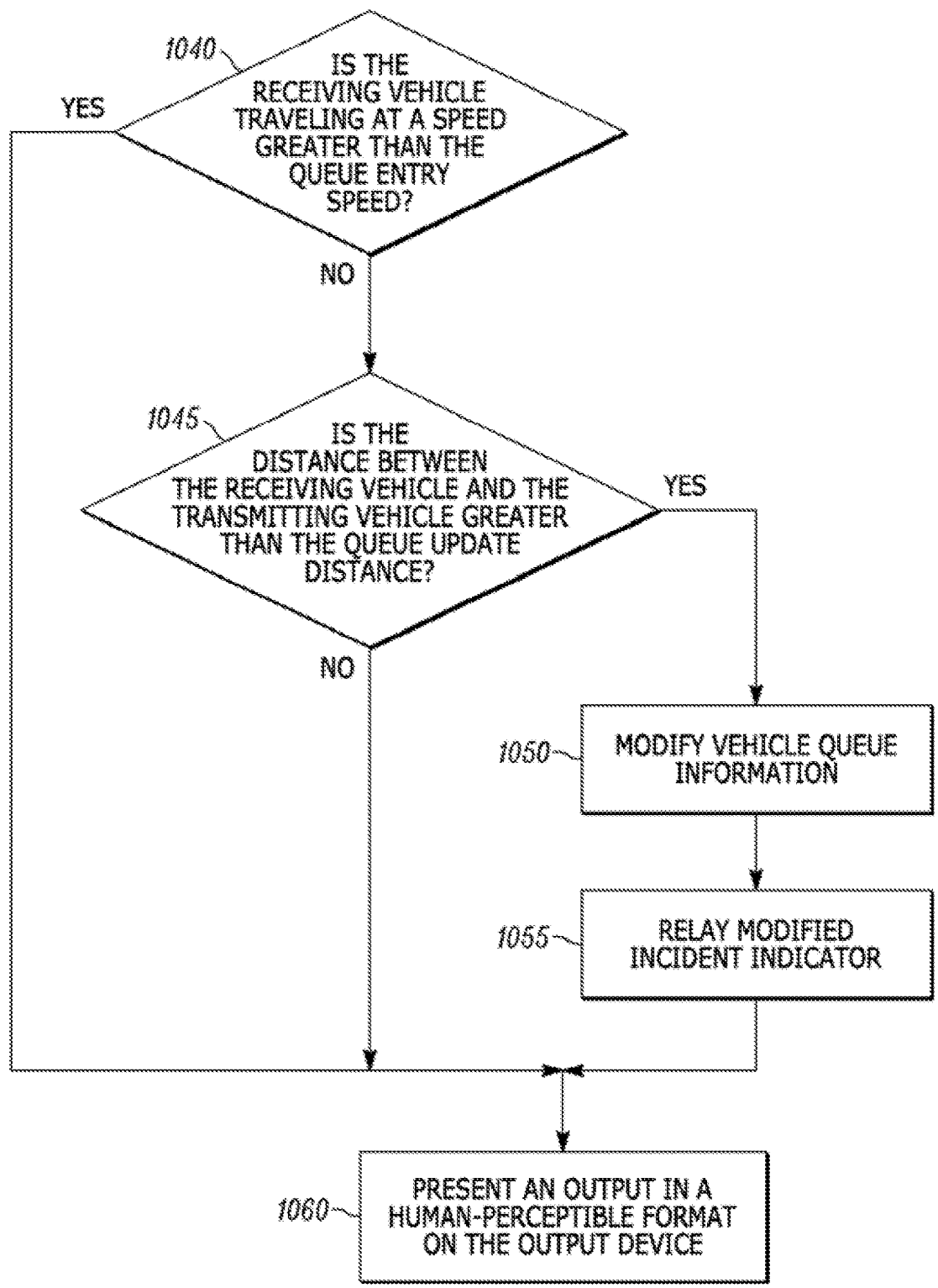

FIGS. 10A through 10C illustrate a flowchart of an exemplary method 1000 executed by the communication device electronic processor 340 of the receiving vehicle 510. By executing the method 1000, the communication device electronic processor 340 may determine which scenario the receiving vehicle 510 is in of the scenarios shown in FIGS. 5 through 9. The communication device electronic processor 340 may then determine whether to modify and/or relay the incident indicator to other vehicles.

At block 1005, the communication device transceiver 325 of the receiving vehicle 510 receives the incident indicator. At block 1010, the communication device electronic processor 340 of the receiving vehicle 510 calculates the distance between the receiving vehicle 510 and the transmitting vehicle 505. In scenarios when the receiving vehicle 510 receives the incident indicator from the road side station 205, at block 1010, the communication device electronic processor 340 of the receiving vehicle 510 calculates the distance between the receiving vehicle 510 and the road side station 205.

The communication device electronic processor 340 of the receiving vehicle 510 may make calculate this distance using a received location of the transmitting vehicle 505 included in the incident indicator. For example, the communication device electronic processor 340 may compare the received location of the transmitting vehicle 505 to a known location of the receiving vehicle 510 (i.e., known through use of a global-positioning system (GPS) included on the communication device 210 of the receiving vehicle 510).

At block 1015, the communication device electronic processor 340 of the receiving vehicle 510 then determines whether the receiving vehicle 510 is located in the specified relay area 410. This may be determined by comparing the distance between the receiving vehicle 510 and the transmitting vehicle 505 to a distance that defines the specified relay area 410. When the receiving vehicle 510 is within the specified relay area 410, the method 1000 proceeds to block 1020 of FIG. 10B. When the receiving vehicle 510 is not within the specified relay area 410, the method 1000 proceeds to block 1040 of FIG. 10C.

In FIG. 10B, at block 1020, the communication device electronic processor 340 of the receiving vehicle 510 determines whether the receiving vehicle 510 is traveling at a speed greater than the queue entry speed. The communication device electronic processor 340 may make this determination in various manners. For example, the receiving vehicle 510 may send data to the communication device 210 that is indicative of the speed of the receiving vehicle 510. Alternatively, the communication device electronic processor 340 may estimate the speed of the receiving vehicle 510 based on data from a global-positioning system (GPS) included on the communication device 210.

When the receiving vehicle 510 is not traveling at a speed greater than the queue entry speed (i.e., the receiving vehicle 510 is queued), at block 1025, the communication device electronic processor 340 of the receiving vehicle 510 modifies vehicle queue information received in the incident indicator, as explained in previous paragraphs, to create the modified incident indicator. At block 1027, the communication device transceiver 325 of the receiving vehicle 510 relays the modified incident indicator to other vehicles. The method 1000 then proceeds to block 1035.

When the receiving vehicle 510 is traveling at a speed greater than the queue entry speed (i.e., the receiving vehicle 510 is not queued), at block 1025, the communication device electronic processor 340 of the receiving vehicle 510 instructs the communication device transceiver 325 to relay the incident indicator to other vehicles without modifying vehicle queue information. However, as mentioned in previous paragraphs, other information such as sending location and/or sender identification may be modified before relaying the incident indicator. At block 1035, the communication device electronic processor 340 of the receiving vehicle 510 generates an output that relates to information included in the incident indicator and instructs the communication device output device 335 to present the output in a human-perceptible format.

In FIG. 10C, at block 1040, the communication device electronic processor 340 of the receiving vehicle 510 determines whether the receiving vehicle 510 is traveling at a speed greater than the queue entry speed. When the receiving vehicle 510 is not traveling at a speed greater than the queue entry speed (i.e., the receiving vehicle 510 is queued), at block 1045, the communication device electronic processor 340 of the receiving vehicle 510 determines whether the distance between the receiving vehicle 510 and the transmitting vehicle 505 is greater than the queue update distance 605.

When the distance between the receiving vehicle 510 and the transmitting vehicle 505 is greater than the queue update distance 605 (i.e., the difference between the vehicle queue length known by the receiving vehicle 510 and the vehicle queue length received in the incident indicator is larger than desired), the method 1000 proceeds to block 1050. At block 1050, the communication device electronic processor 340 of the receiving vehicle 510 modifies vehicle queue information received in the incident indicator, as explained in previous paragraphs, to create the modified incident indicator. At block 1055, the communication device transceiver 325 of the receiving vehicle 510 relays the modified incident indicator to other vehicles. The method 1000 then proceeds to block 1060.

At block 1045, when the distance between the receiving vehicle 510 and the transmitting vehicle 505 is not greater than the queue update distance 605, the communication device electronic processor 340 does not modify or relay vehicle queue information received in the incident indicator, and the method 1000 proceeds to block 1060. Similarly, at block 1040, when the receiving vehicle 510 is traveling at a speed greater than the queue entry speed (i.e., the receiving vehicle 510 is not queued), the communication device electronic processor 340 of the receiving vehicle 510 does not modify or relay vehicle queue information received in the incident indicator, and the method 1000 proceeds to block 1060. At block 1060, the communication device electronic processor 340 of the receiving vehicle 510 generates an output that relates to information included in the incident indicator and instructs the communication device output device 335 to present the output in a human-perceptible format.

The method 1000 repeats each time an incident indicator is received by a communication device 210 of a vehicle. Additionally, the communication device electronic processor 340 may compare information received in one incident indicator to information received in another incident indicator. When the information is substantially similar, the communication device electronic processor 340 may control components of the communication device 210 in a certain manner. For example, the communication device electronic processor 340 may not instruct the communication device output device 335 to present repetitive outputs relating to the incident 110 even though incident indicators from numerous transmitting vehicles were received.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A first communication device for use with a first vehicle in a system for transmitting information about an incident occurring on a road, the first communication device comprising:
   a first receiver to receive an incident indicator from one of a group consisting of a road side station and another vehicle,
   a first electronic processor electrically coupled to the first receiver and a first transmitter and configured to
      determine, as a function of incident information included in the incident indicator and one or more sensed parameters of the first vehicle, whether to relay a modified incident indicator to one or more other vehicles,
      modify at least a portion of the incident information included in the incident indicator to create the modified incident indicator based on the one or more sensed parameters of the first vehicle, wherein at least one of the incident indicator and the modified incident indicator includes information relating to a vehicle queue, the vehicle queue representing a plurality of vehicles that are traveling below a queue entry speed, wherein, when the first vehicle is located outside a specified relay area, the first vehicle is traveling at a speed less than or equal to the queue entry speed, and a distance between the first vehicle and the one of a group consisting of the road side station and the another vehicle is greater than a queue update distance, the first electronic processor is configured to modify the information relating to the vehicle queue to create the modified incident indicator and control the first transmitter to transmit the modified incident indicator to a second vehicle, and
      control the first transmitter to transmit the modified incident indicator to the one or more other vehicles.

2. The first communication device of claim 1, wherein at least one of the incident indicator and the modified incident indicator includes information relating to at least one of the group consisting of a description of the incident, a lane identification of the incident, a maximum allowable speed to be traveled through the incident, and an incident location.

3. The first communication device of claim 1, wherein the incident information that is modified to create the modified incident indicator includes at least one of the group consisting of a distance to the incident and a status of a lane on the road.

4. The first communication device of claim 1, wherein the first electronic processor is configured to control the first transmitter to transmit the modified incident indicator to the second vehicle when the first vehicle is located in the specified relay area.

5. The first communication device of claim 1, wherein, when the first vehicle is traveling at a speed less than or equal to the queue entry speed and the first vehicle is located in the specified relay area, the first electronic processor is configured to modify the information relating to the vehicle queue to create the modified incident indicator; and control the first transmitter to transmit the modified incident indicator to the second vehicle.

6. The first communication device of claim 1, wherein the one or more sensed parameters of first vehicle include at least one from the group consisting of a speed of the first vehicle and a distance between the first vehicle and the one of a group consisting of the road side station and the another vehicle.

7. The first communication device of claim 1, further comprising a first output device,
   wherein the first electronic processor is configured to generate a first output that includes at least a portion of the incident information, and
   wherein the first output device presents the first output in a first human-perceptible format.

8. The first communication device of claim 1, further comprising a second communication device for use with the second vehicle, the second communication device comprising:
   a second receiver to receive the modified incident indicator from the first communication device,
   a second electronic processor electrically coupled to the second receiver and configured to generate a second output that includes information related to the incident, and
   a second output device to present the second output in a second human-perceptible format.

9. A method of transmitting information about an incident occurring on a road, the method comprising:
   receiving, by a first receiver of a first communication device for use with a first vehicle, an incident indicator from one of a group consisting of a road side station and another vehicle, wherein receiving, by the first receiver, the incident indicator includes receiving, by the first receiver, information that relates to a vehicle queue, the vehicle queue representing a plurality of vehicles that are traveling below a queue entry speed;
   determining, with a first electronic processor, as a function of incident information included in the incident indicator and one or more sensed parameters of the first vehicle, whether to relay a modified incident indicator to one or more other vehicles;
   modifying, with the first electronic processor, at least a portion of the incident information included in the incident indicator to create the modified incident indicator based on the one or more sensed parameters of the first vehicle;
   transmitting, with a first transmitter, the modified incident indicator to the one or more other vehicles; and
   when the first vehicle is traveling at a speed less than or equal to the queue entry speed and the first vehicle is located in a specified relay area,
      modifying, with the first electronic processor, the information relating to the vehicle queue to create the modified incident indicator; and
      transmitting, with the first transmitter, the modified incident indicator to a second vehicle.

10. The method of claim 9, wherein receiving, by the first receiver, the incident indicator includes receiving, by the first receiver, incident information that includes at least one selected from the group consisting of a description of the incident, a lane identification of the incident, a maximum allowable speed to be traveled through the incident, and an incident location.

11. The method of claim 9, wherein modifying, with the first electronic processor, at least a portion of the incident information includes modifying, with the first electronic processor, incident information that includes at least one selected from the group consisting of a distance to the incident and a status of a lane on the road.

12. The method of claim 9, wherein transmitting, with the first transmitter, the modified incident indicator to the one or more other vehicles includes transmitting, with the first transmitter, the modified incident indicator to the second vehicle when the first vehicle is located in the specified relay area.

13. The method of claim 9, further comprising, when the first vehicle is traveling at a speed less than or equal to the queue entry speed and the first vehicle is located in the specified relay area, modifying, with the first electronic processor, the information relating to the vehicle queue to create the modified incident indicator; and transmitting, with the first transmitter, the modified incident indicator to the second vehicle.

14. The method of claim 9, wherein modifying, with the first electronic processor, at least a portion of the incident information included in the incident indicator to create the modified incident indicator based on the one or more sensed parameters of the first vehicle includes modifying, with the first electronic processor, at least a portion of the incident information included in the incident indicator to create the modified incident indicator based on at least one of the group consisting of a speed of the first vehicle and a distance between the first vehicle and the one of a group consisting of the road side station and the another vehicle.

15. The method of claim 9, further comprising:
generating, with the first electronic processor, a first output that includes at least a portion of the incident information; and
presenting, with a first output device, the first output in a first human-perceptible format.

16. The method of claim 9, further comprising:
receiving, by a second receiver of a second communication device for use with the second vehicle, the modified incident indicator from the first communication device;
generating a second output that includes information related to the incident; and
presenting the second output in a second human-perceptible format.

* * * * *